US010469699B2

(12) United States Patent
Talwerdi (10) Patent No.: US 10,469,699 B2
(45) Date of Patent: Nov. 5, 2019

(54) REMOTE MARK PRINTING ON A SECURITY DOCUMENT

(71) Applicant: SICPA HOLDING SA, Prilly (CH)

(72) Inventor: Mehdi Talwerdi, British Columbia (CA)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 15/569,012

(22) PCT Filed: Sep. 20, 2016

(86) PCT No.: PCT/EP2016/072257
§ 371 (c)(1),
(2) Date: Oct. 24, 2017

(87) PCT Pub. No.: WO2017/050737
PCT Pub. Date: Mar. 30, 2017

(65) Prior Publication Data
US 2018/0126763 A1    May 10, 2018

(30) Foreign Application Priority Data

Sep. 24, 2015 (EP) ..................................... 15186696

(51) Int. Cl.
*H04N 1/32* (2006.01)
*G06Q 10/10* (2012.01)
(Continued)

(52) U.S. Cl.
CPC .......... *H04N 1/32144* (2013.01); *B41M 3/14* (2013.01); *B42D 25/24* (2014.10); *B42D 25/305* (2014.10);
(Continued)

(58) Field of Classification Search
CPC ........... H04N 1/32128; H04N 1/32133; H04N 1/32144; H04N 1/32149; G06F 3/1238;
(Continued)

(56) References Cited

U.S. PATENT DOCUMENTS 7,314,162 B2    1/2008 Carr et al.
7,503,488 B2    3/2009 Davis
(Continued)

FOREIGN PATENT DOCUMENTS

CN    102216926    10/2011
WO    2013067092   5/2013

OTHER PUBLICATIONS

International Search Report and Written Opinion issued with respect to application No. PCT/EP2016/072257.
(Continued)

*Primary Examiner* — Scott A Rogers
(74) *Attorney, Agent, or Firm* — Muncy, Geissler, Olds & Lowe, P.C.

(57) ABSTRACT

A system for remote mark printing on a security document comprising an interface adapted to receive, from field equipment and via a network, request information relating to a mark to be printed on a security document; a mark generation module adapted to generate data defining a mark to be printed on the security document; a remote printer control module adapted to control printing equipment remote from the system to print the mark on the security document.

14 Claims, 2 Drawing Sheets

(51) Int. Cl.
| | |
|---|---|
| *B42D 25/305* | (2014.01) |
| *B42D 25/24* | (2014.01) |
| *B41M 3/14* | (2006.01) |
| *G06K 9/00* | (2006.01) |
| *G06Q 10/06* | (2012.01) |
| *G06Q 50/26* | (2012.01) |
| *G06F 3/12* | (2006.01) |
| *H04L 29/06* | (2006.01) |

(52) U.S. Cl.
CPC ..... *G06K 9/00442* (2013.01); *G06Q 10/0635* (2013.01); *G06Q 10/10* (2013.01); *G06Q 50/265* (2013.01); *H04L 63/02* (2013.01); *H04L 63/0428* (2013.01); *G06F 3/1285* (2013.01)

(58) Field of Classification Search
CPC . G06F 3/1285; G06F 3/1286; G06K 9/00442; G06K 9/00449; G06K 9/00456; G06K 9/00469; G06K 15/4095; B41M 3/14; B42D 25/24; B42D 25/305; G06Q 10/0635; G06Q 10/10; G06Q 50/265
See application file for complete search history.

(56) References Cited

U.S. PATENT DOCUMENTS

| | | | |
|---|---|---|---|
| 7,753,294 B2* | 7/2010 | Sugawara | B02C 18/0007 241/101.2 |
| 7,958,147 B1 | 6/2011 | Turner et al. | |
| 8,461,551 B2* | 6/2013 | Walker | G06K 19/086 250/461.1 |
| 2010/0114995 A1 | 5/2010 | Kopp et al. | |
| 2014/0363057 A1* | 12/2014 | Eckel | G06F 21/32 382/116 |
| 2015/0143535 A1 | 5/2015 | Mansi et al. | |
| 2016/0125231 A1* | 5/2016 | Stoyanov | G06K 9/00288 382/116 |

OTHER PUBLICATIONS

Chinese Office Action in counterpart Chinese Application No. 201680025844.9 dated May 13, 2019 (and English language translation of the Office Action).

* cited by examiner

REMOTE MARK PRINTING ON A SECURITY DOCUMENT

TECHNICAL FIELD

The present invention relates to systems, entities, and methods for remote mark printing on security documents. More specifically, the present invention relates to remote marking of passports as an exemplary security document with corresponding stamps, labels, visa, and the like.

BACKGROUND

It is common in most countries that individuals are checked at border checkpoints when entering or exiting the country. Various rules and laws regulate whether individuals are permitted entry or whether entry (or exit) is denied. A common means is the issuance of visas that the grant to the individual access to a country for a given limited period (e.g. 30 or 90 days, etc.) or with no limitations. Usually, the individual presents his/her passport at the border checkpoint when entering the country and an official checks the visa status. If entry can be permitted, a physical stamp or label is applied to the passport that indicates entry (possibly in conjunction with an entry location and date) or represents the visa itself. Upon leaving the country a further mark is applied to the passport, so that the passport can be checked for determining whether an individual is permitted to stay in some country, whether a permissible time has expired, or whether a number of permissible (re)entries to a country is exhausted.

The drawback with stamps and labels, or in general a mark, applied to passports and other security documents is that the location and quality of the mark in the document may vary to a great extent. Specifically, a stamp (rubber stamp) may be applied with poor quality so that legibility of the mark is adversely affected or the mark interferes with already existing marks so that their respective legibility is affected. Furthermore, the position of corresponding marks (e.g. entry stamp and exit stamp) may not be well-defined so that officials have to browse the entire passport so as to look for an entry stamp and so as to look for a suitable location of an exit stamp. This takes time and the officer at the checkpoint is only able to process a limited number of individuals per given time. Furthermore, security documents such as passports, have only a limited space available for marks, so that inefficient use of the available space may require the issuance of a new passport before a further visa can be applied.

In other words, official (e.g. visa, entry, exit, customs form) stamps are occasionally incorrectly applied to the associated security document (e.g. passports with stamps stamped on an incorrect section of a passport, such as within the boundaries of a machine-readable zone). Official stamps may further be occasionally improperly applied (e.g. showing the wrong date or time, non-uniformly applied so as to be smudged or include illegible portions), or the wrong stamp-type (e.g. work visa, student visa, etc.) is occasionally stamped on a passport, or an official (e.g. visa) stamp may be improperly issued (e.g. stamped on a passport when the passport holder does not in fact qualify for the selected official stamp). In addition to the above, physical rubber stamps are easy to copy or otherwise counterfeit.

At the same time, electronic systems for issuing and authenticating security documents, such as passports, identity cards, visa, driving licenses, and the like, are common practice in most countries all over the world today. Such systems usually comprise central data repositories that are connected by means of well protected, closed protocols and data links to the equipment and terminals in the field. The field equipment usually comprises data terminals, scanners, printers, and the like.

Usually, authorized personnel employ such systems at, for example, border checkpoints (immigration), authority office premises, airports, and mobile checkpoints as part of common police patrols. Specifically, authorized personnel may check a security document from an owner in the field by querying personal data taken from the security document by means of accessing the mentioned special central data repositories. The system may provide an analysis result to a terminal in the field so that the personnel can take appropriate action, e.g. letting the checked person pass a security checkpoint, arresting the checked person, providing the checked person with a certificate, applying a stamp or mark to the presented security document, etc. For example, an officer can query the system whether a presented passport and visa is genuine and correspondingly retrieve information whether or not a mark to the passport should be applied and the individual can pass the checkpoint and enter the country. It is further common that the field equipment produces self-adhesive labels, for example with a two-dimensional barcode and other features, so that the officer can simple print such a label and apply it to the passport.

The publication U.S. Pat. No. 7,314,162 discloses a method and system for reporting identity document usage by storing in a database and reporting to an identity document owner instances in which that person's driver's license, passport or other government-issued identification documents are presented as a form of ID, thereby facilitating early notification of identity theft.

Further, the publication U.S. Pat. No. 7,503,488 discloses a method of assessing the risk of fraud before issuing a driver's license to an applicant on the basis of the relative incidence of fraud historically associated with the particular combination of collateral identification documents (e.g. birth certificate, passport, student ID card, etc.) presented by the applicant in their application for the driver's license.

It is therefore an object of the present invention to provide a system for remote mark printing on security documents that makes, one the one hand, efficient use of existing infrastructure (i.e. equipment in the field, central data processing and repositories, and networks connecting the same), and on the other hand, is sufficiently secure and reliable so that it can be used in the context of security documents, such as passports. It is specifically and object of the present invention to provide a solution to the problematic and unsatisfactory application of marks to passports and security documents.

In addition to the above, it may desirable to respond to the theft, copying, and/or counterfeiting of a country's official (e.g. visa) stamp by rapidly replacing all of the country's official stamps with new stamps having a new design. However, in the case of physical rubber stamps, updating an official stamp involves physical replacement of a multitude of such physical stamps located at a multitude of border control facilities around a country's border, embassies worldwide and other facilities employing such stamps, which is time-consuming and expensive, and thereby inhibits a country's ability to rapidly update their official stamps.

SUMMARY

The above mentioned problems and drawbacks of the conventional concepts are solved by the subject-matter of the independent claims. Further preferred embodiments are described in the dependent claims.

According to an embodiment of the present invention, a system is provided a system for remote mark printing on a security document comprising an interface adapted to receive, from field equipment and via a network, request information relating to a mark to be printed on a security document; a mark generation module adapted to generate data defining a mark to be printed on the security document; a remote printer control module adapted to control printing equipment remote from the system to print the mark on the security document.

According to an embodiment of the present invention, a method is provided a method for remote mark printing on a security document comprising a step of receiving, from field equipment and via a network, request information relating to a mark to be printed on a security document; a step of generating data defining a mark to be printed on the security document; a step of remotely controlling printing equipment remote from the system to print the mark on the security document.

BRIEF DESCRIPTION OF THE DRAWINGS

Embodiments of the present invention, which are presented for better understanding the inventive concepts but which are not to be seen as limiting the invention, will now be described with reference to the Figures in which.

DETAILED DESCRIPTION

Figures 1A, 1B:
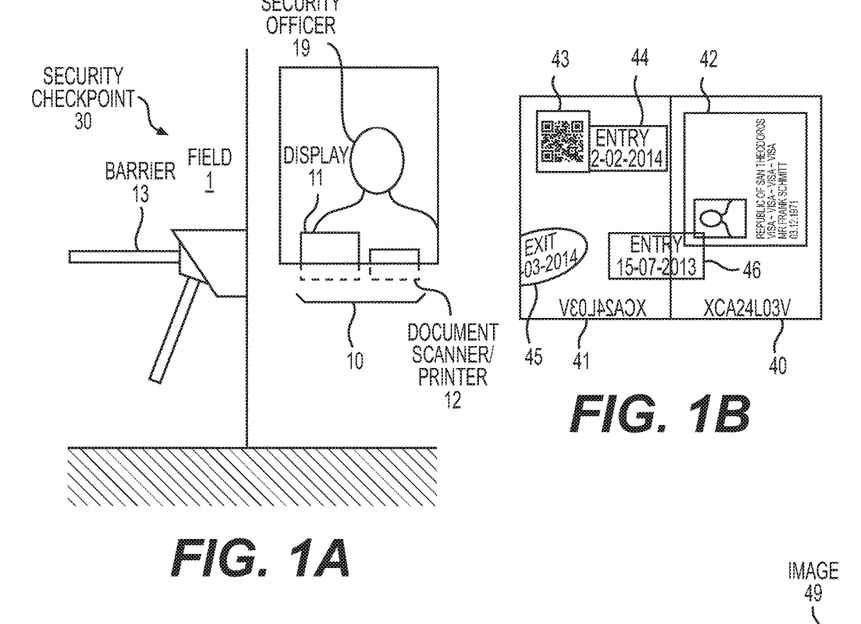
FIG. 1A shows a schematic view of a conventional border checkpoint with electronic equipment for analyzing a security document.
FIG. 1B shows a schematic view of a security document with marks for the example of a passport with visas, stamps, and labels.

FIG. 1A shows a schematic view of a conventional border checkpoint with electronic equipment for analyzing a security document and for printing. Specifically, there is shown a checkpoint 30 as part of security equipment in the field 1. Generally, the term field relates to all the locations where corresponding equipment and components are distributed. This field equipment, therefore, includes components such as any type of input terminal, cameras, display terminals, scanners, printers, and the like. In the shown example, the checkpoint 30 allows a security officer 19 to operate, for example, a display terminal 11 and a scanner/printer 12.

In a usual scenario, an individual will present a security document to the officer 19. Accordingly, it is assumed that the individual is the owner of the security document and the correct ownership and/or the corresponding authenticity of the presented security document is analyzed and checked. More specifically, the individual will present the security document to the officer 19, who, in turn may employ the scanner 12 for scanning the security document or parts thereof. Usually, the scanner 12 will employ data-processing techniques for extracting information concerning the individual (or the owner of the presented security document), such as a name, a date of birth, and/or a security document number, either in biographic or biometric format such as RFID content, etc.

In general, any of the following data items may represent so-called additional data concerning the individual/owner/holder of the security document: surname, given name, date and place of birth, country of citizenship, place and country of residence, document number, document type identification, document issue date, document issue place, biometric data of the owner, image data or graphical data concerning the face, fingerprints, or other physical characteristics of the document owner, and the like.

Once the scanner 12 has generated such information concerning the individual, this information can be forwarded via a secure link to some kind of central repository (not shown). This repository is likely to be a server and or resources of a datacenter, private network and/or cloud infrastructure, that are arranged and able to analyze the received information with regard to authentication. For example, the repository may store data concerning whether or not the individual has the right to enter a given country. Assuming that the shown checkpoint 30 is located before a departure gate or electronically connected securely (wired or wireless) to the airport, the repository may store data indicating whether or not the individual has rightfully entered the country and is now leaving the country within a permissible visa duration. For example, the repository may inform the officer 19 via the display terminal 11 that the individual who presented his/her passport at the checkpoint 30 has stayed longer in the country than permitted by his/her respective visa. The officer 19 may accordingly operate a barrier 13 so as to allow arresting of the individual. Naturally, the officer 19 may also operate the barrier 13 so as to let the individual pass if a response from the repository 120 indicates that everything is in order.

Likewise, if the checkpoint 30 is part of a border entry, the individual presenting the security document is checked by the officer 19 whether he/she may enter the country and what kind of visa status need to be observed. It is common that upon permission to enter the country, the officer generates and applies a visa label or stamp to the presented passport. The conventional arts consider here rubber stamps or the printing of self-adhesive labels that are correspondingly applied to a suitable free space of the security document (e.g. passport).

In general, the conventional electronic systems for security document analysis usually employ distributed equipment field 1 and some kind of central resources located at one or more central locations for data storage and analysis. The link may be implemented by a dedicated special signal line, or maybe some kind of secure communication over existing communication networks, such as the Internet (e.g. VPN connection, tunnels, etc.). These conventional systems suffer from the drawback that it is difficult to add or change the components of the field equipment 10.

FIG. 1B shows a schematic view of a security document with marks for the example of a passport with visas, stamps, and labels. Specifically, there is shown an opened booklet of a passport as an example for a security document 40. The passport 40 may usually be provided with some kind of identification information such as a passport number 41. The Passport owner (individual) may have applied for a visa for a given country which was granted and accordingly applied to the passport 40 as some kind of visa label 42. This visa label may in turn comprise corresponding identification information and security features, such as photographs, holograms, and the like.

As shown, the passport 40 has further applied marks in the form of a label 43, and stamps 44, 45, and 46. As already mentioned, the application of stamps and labels may suffer from various drawbacks. In particular, a label 43 may be applied in the way so that it covers part of an earlier applied stamp 44. In this way, legibility of the stamp 44 may be severely affected. Similarly, a stamp 45 may be applied in an incorrect fashion so that only a part thereof appears on the passport 40. A further but not final example is stamp 46 that was applied with poor quality so that also legibility is severely affected. The latter may be the result of too little ink or application pressure employed when applying stamp 46 to passport 40. Moreover, stamp 46 is again applied in a fashion so that legibility of other passport marks may be severely affected.

Figure 2:
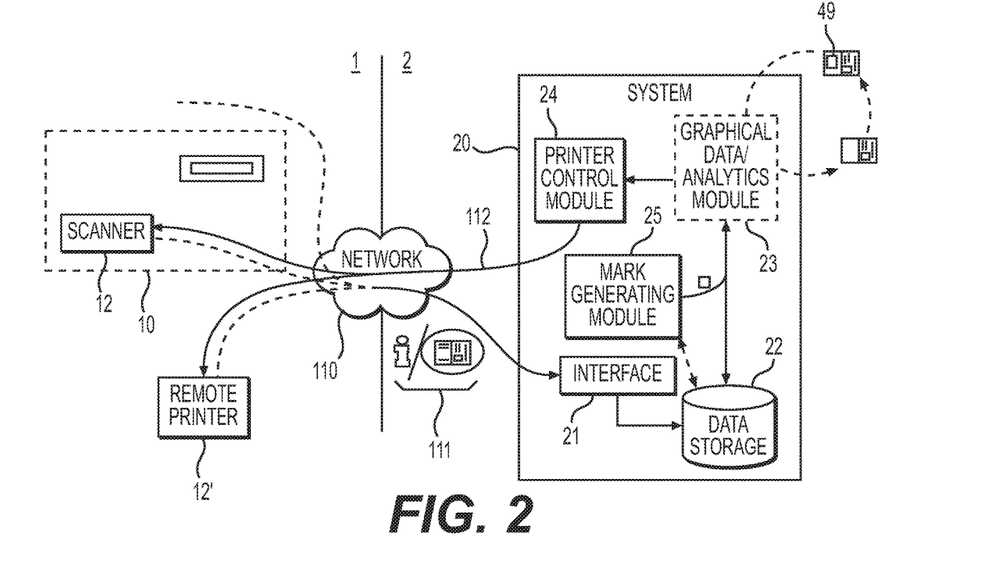
FIG. 2 shows a schematic view of a deployment of a system for remote mark printing on security documents according to an embodiment of the present invention.

FIG. 2 shows a schematic view of a deployment of a system for remote mark printing on security documents, such as passports, according to an embodiment of the present invention. A corresponding system 20 is provided at some kind of central location 2 in the sense that it can be remote from the various sites in the field 1, where the equipment for scanning, printing, data input/output etc. is distributed. Generally, the system 20 provides remote mark printing on security documents and hence comprises an interface 21 adapted to receive, from equipment in the field 1 and via a network 110, request information 111. This kind of information may comprise any suitable data to effect a secure request for remote mark printing. Specifically, the request information 11 may comprise information for identifying a presented passport and/or holder thereof, information on the type of the requested mark, information on the properties of the mark (e.g. duration of permitted stay to appear in the mark), and the like. The request may likewise be effected by receiving image data 111 of a scanned security document. In this way, the interface 21 can receive graphical data from any type of scanner and data source in the field 1. The graphical data is generally of a scanned image of the security document in the sense that the security document is scanned so as to generate a digital image in the form of said graphical data. Therefore, said graphical data may determine color or brightness values of the pixels from which the image can be compiled.

In this way, the system 20 does not rely on or even require specialized and proprietary data formats but, rather, is able to accept and process graphical image data received via any type of network, such as the Internet, intranet, mobile devices and other means of networking such as a satellite. As a consequence, any suitable scanning equipment can be employed for scanning a security document and generating the respective image data. Said scanning equipment may thus include scanners or printers 12 of dedicated field equipment already existing and employed by the corresponding body/authority. For example, the field equipment 10 can be third-party equipment provided to the body/authority in connection with a specialized central repository as discussed and explained in greater detail in conjunction with FIG. 1.

Likewise, the equipment can also include individual or stand-alone components that are not part of or dependent on any specific field equipment 10, such as the scanner, printer or integrated device 12'. Furthermore, any other data source is envisaged so as to generate and forward the request information 111 in relation with a security document via the network 110 to the system's interface 21. The system 20 further comprises a data storage 22 adapted to store a data record in relation to the request information. In the case that image data of the scanned security document is provided the data record may well comprise the received image data and additional data in relation to an owner of the scanned security document.

The system 20 further comprises a mark generation module 25 that is adapted for providing data that defines the mark to be printed on the security document. The mark generation module 25 may employed for this purpose also the data storage capacity of the data storage 22 or may well also access a separate dedicated data storage. In order to generate the mark, the mark generation module 25 may rely on a separation into constant and dynamical parts of the mark. More specifically, the mark generation module 25 may compile the mark so that a constant part applies to several marks, whereas the dynamical part may be dependent on the specific mark request. For example, the constant part may include all information and graphical design features for a visa mark of a given country. The dynamical part may thus be generated specifically for the mark that is to be printed onto a target security document so as to reflect information like an entry date, a permission duration, an entry location, a serial number, any other security feature code, and the like.

An optional graphical data processing/analytics module 23 may be provided within the system 20. This module 23 may be adapted to analyze the received request information with regard to generating a corresponding analysis result. In this way, the system 20 may be able to perform a plausibility or rule conformity check in response to the received request information. For example, the request information may comprise information that identifies an individual who seeks entry to a given country, and the analysis result may indicate whether or not access is granted to the individual. Similarly, the analysis result may indicate whether a requested mark should indeed be printed on the remote security document. In this way, the module 23 may be arranged to command a remote printer control module 24 accordingly.

Said printer control module 24 of the system 20 is adapted to remotely control printing equipment in the field 1 so as to print the mark remotely onto the security document. More specifically, the printer control module 24 establishes a control link 112 to corresponding printing equipment in the field one, such as the device 12' which is, in the present example an integrated device operable to both scanning a presented security document as well as printing onto this document. According to a specific embodiment of the present invention, the printer control module 24 controls the remote printing equipment 12' so as to print the mark while avoiding the possibility to reproduce the mark in an unauthorized fashion. For example, the printer control module 24 may provide printing commands to the remote printing equipment 12' in some kind of chopped sequence wherein a subsequent portion of the mark is only transmitted from the printer control module 24 when corresponding feedback has been received that a preceding sequence was actually printed to the security document. This one by one approach may render it difficult to intercept the control data flow so as to reproduce the mark in an unlawful way.

According to a further embodiment of the present invention, the module 23 may additionally or alternatively to the analysis carry out graphical data processing so as to superimpose image of a mark onto the image of the security document. In line with the present embodiment, the system 20 comprises a module 23 that retrieves the graphical data of the scanned image of the security document from the data storage 22. The module 23 can be then adapted to superimpose an image 49 of a mark provided by the module 25 onto the image of the security document. In this way, the module 23 can generate so-called further graphical data of the scanned image of the security document with the mark. This further graphical data may be stored back the data storage 22 or to another, dedicated data storage. In other words, a virtual marking of the security document is obtained that may advantageously reflect the actually printed mark on the security document. In this way, access to this further graphical data may allow authorized personnel to verify the appearance of a mark printed on a presented security document. For example, the authorized personnel may determine an irregularity if the appearance of the mark actually printed on a security document does not match with the appearance of the further graphical data.

Generally, the embodiments of the present invention allow for mark printing to a security document with a well-defined and controlled quality following likewise well-defined rules and requirements. Specifically, the mark can be printed on the security document at a suitable position employing suitable colors and or contrast variations. Specifically, the data storage 22 may store, or the system 20 may acquire from an external data source, data that reflects the positioning of marks printed to a specific security document in the past. By querying and evaluating such data, it is possible to determine a location of printing the mark to the security document in a more efficient fashion. In particular, the position of a country exit mark may be chosen to be close to the location of a country entry mark. This may allow for easy and fast processing at checkpoints. Further, the limited space of a security document may be used more efficiently, so that it can carry more marks whilst avoiding that one mark affects appearance and/or legibility of another mark.

Figure 3:
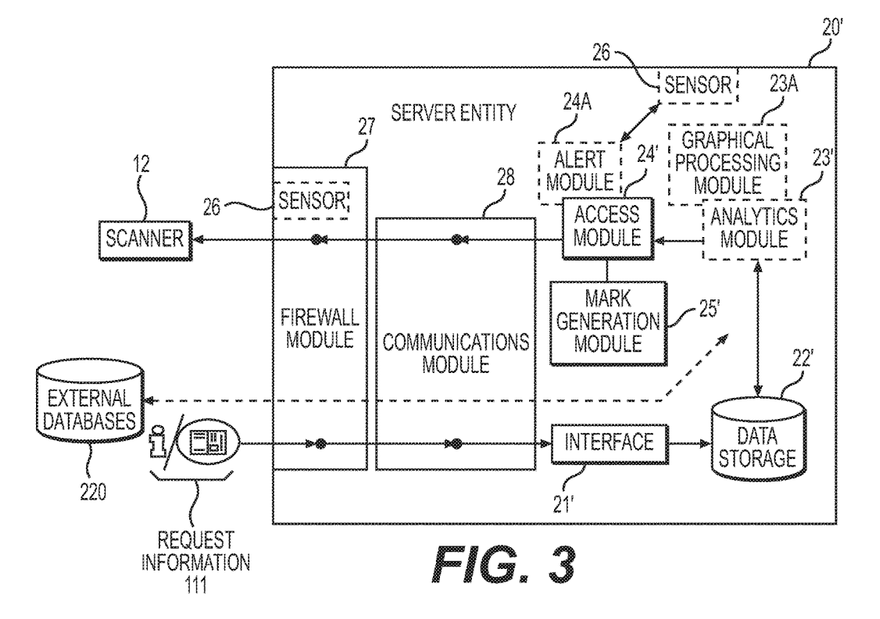
FIG. 3 shows a schematic view of a server entity for remote mark printing on security documents according to a further embodiment of the present invention.

FIG. 3 shows a schematic view of a server entity for remote mark printing according to a further embodiment of the present invention. In this embodiment, the system functionalities are integrated in a server entity, i.e. in the form of an application running on some kind of processing resources (server, dedicated hardware, share of a datacenter). Similar to the system as described in conjunction with FIG. 2, the server entity 20' comprises an interface 21 adapted to receive, from field equipment 10 and via a network 110, request information 111. The server entity 20' further comprises a data storage 22 adapted to store a data record comprising any received image data and additional data in relation to an owner of the scanned security document and any received request.

Further, the server entity 20' may comprise an optional analytics module 23' and/or an optional graphical data processing module 23A adapted to evaluate a received request and generate a corresponding analysis result, and, respectively, superimpose an image of a mark onto the image of the security document. The graphical data processing module 23A is further adapted to generate further graphical data of the scanned image of the security document with the mark. This further graphical data may be stored back to the data storage 22' or to another external data storage. Yet further, the server entity 20' comprises an access module 24' adapted to provide access to the further graphical data.

In this embodiment, the interface 21' is implemented as an application server that may provide privately owned cloud-based operational control of a reader, scanner, printer and/or integrated reader/scanner/printer, whichever may be installed in the field. The application server 21' may provide other administrative functions, thereby relieving the burden of integrating any scanner/reader/printer into existing third-party electronic systems. The data storage 22' can be implemented as a data collection module that is adapted to collect and store in a database all desired data. The type of data that can be stored may be limited or restricted by national legislation (e.g. privacy laws). However the stored data can be in form of data records that can be associated with each use or selected uses of a security document or value item (passport).

A data record may include any of the following: (i) image data of scan of the security document by the a reader/scanner or integrated device, including multiple scans at multiple wavelengths of electromagnetic radiation, ultrasound scans (e.g. of liquids as part of the security document or value items), x-ray scans, laser scans, etc.; (ii) security document identification such as a passport number, image(s) or other identification of the passport and its contents, including position within a given passport of any prior official (e.g. visa) stamps in that given passport; (iii) biometric and/or biographic data of the document's or item's holder or owner, such as fingerprints, eye scans, facial scans, body scans, infrared heat sensor data, audiovisual recordings, etc.; (iv) date, time and location of each use or selected uses of the document/item, including for example whenever a passport is scanned at a passport scanning facility such as a border crossing (checkpoint), transportation hub such as at airports, ship docks and train stations, or at banks, hotels, etc., or whenever a value item is scanned at a scanning facility; (v) sound, image or video recordings of interactions between document/item holders and officials (personnel) at a passport scanning facility or other recordings related to use of the document/item, associated media metadata (e.g. number of frames recorded, frequency signatures of voice or other recorded data) and metrics calculated from such media metadata (e.g. which can be encrypted and employed to complement existing anti-tampering technologies); (vi) video data showing persons using the passport or other value item; (vii) travel information associated with the value item holder or owner, e.g. arrival and/or destination information, such as an airline flight no. associated with a passport being scanned at an airport or other passport scanning facility; (viii) medical information (e.g. health status, prior exposure to communicable diseases, medical reports, etc., associated with a passport holder, individual (e.g. refugee) present at an official data collection facility, or value item owner; (ix) related documentation, such as a scan of customs forms, scans of secondary identification documents, notes by officials involved, etc. (x) identity of the responsible officer involved with handling a passport or other value item, such as where the officer is identified by fingerprint using the corresponding equipment, if installed, or other biometric for example; and (xi) RFID contents where a RFID chip is installed in a passport, label or sticker (e.g. affixed to an object) or value item and scanned at the (passport) scanning facility. The database may also store information related to visa, national entry, national exit, custom form, passport stamps or other official stamps for use in centrally (i.e. remotely) controlling a scanner, reader, printer and/or integrated device, whichever may be installed.

The optional analytics module 23' may be adapted to analyze the data records stored in the data storage 22 and to generate a corresponding analysis result. Specifically, the analytics module 23A may look at identity or security items in connection with the additional data that is stored with the corresponding data record. For example, the identity item may lead to identification of a specific individual who is holder of a visa. The additional data may then, following this example, indicate a permissible region or period where and when the individual may reside. If an inconsistency is found by the analytics module 23', a corresponding flag can be launched or a notification can be launched based on the analysis result taken in the analytics module 23A. By means of the notification, an officer in the field 1 can be notified of the analysis result remotely taken in the server entity 20'.

The analytics module 23' may be specifically configured to analyze the data stored in the database to determine, in real-time, potentially irregular use of a passport or other value item, such as where an entry into or exit from a country is being attempted by a passport holder without a corresponding preceding exit or entry, or where a value item holder is exhibiting notable behavioral patterns such as nervousness. In general, such analysis may be referred to as plausibility checks and/or checking any incoming information that is associated to an event (e.g. attempted border crossing) with the conformity to one or more predetermined rules. For example, a rule may define that a given individual needs to have entered a country, and to have been accordingly registered, before an attempt to leave the country is observed. In one embodiment, the analytics module 23A is adapted to make a determination whether or not a mark is superimposed by the graphical processing module 23'. Further, the analytics module 23A may be adapted to make a determination of a location within the security document the mark image is superimposed.

Furthermore, the analytics module 23' may also monitor external databases 220, e.g. of INTERPOL, Europol, national criminal record databases, and other databases to identify individuals of interest who are attempting to use a passport at a passport scanning facility or other value item at a scanning facility. The analytics module 23' may further monitor length-of-stay restrictions to issue an alert if a passport holder has an "overstay" (e.g. has not exited a country by the expiry date of their visa) or has an "understay" (e.g. has not stayed a sufficient amount of time in a country to qualify for a specifiable immigration status). The printer control module 24' is, like in the other described embodiments, adapted to control a remote printer 12 to print a mark provided by the mark generating module 25' onto the security document in the field.

Besides, an alert module 24A can be implemented as a dedicated alert module that is arranged to alert the responsible officer or other official when the document/item (e.g. passport or other value item) scanned by the officer has been flagged by the analytics module 23' as being associated with irregular use or otherwise problematic. Alerts can also be generated when tampering or other physical damage to the server entity 20' or a module thereof is detected. For this purpose a sensor 26 may be provided (e.g. temperature, pressure, vibration, location, etc.) that is configured to detect tampering. Alerts, or, more generally, notification may be provided via a secure communications module (described below), and/or by email, text and/or voice message (e.g. to a mobile telephone), etc. to the responsible officer or other official. Alerts may be provided to any official agency worldwide, as permitted by law, for the purposes of proactive security.

A firewall module 27 may be provided that is adapted to protect the server entity 20' from external, Internet-based attacks. The firewall module may also comprise the above mentioned sensors 26 that are suitable to monitor for physical tampering, intrusion or other damage to the special-purpose hardware components. In this way, it may be referred to the module 27 as a firewall and anti-tamper module.

A secure communications module 28 may be provided for encryption of communications between the server entity 20' and electronic systems of participating national governments, agencies thereof, commercial enterprises, or other customers, i.e. the field equipment, using encryption techniques consistent with customer preferences and legal requirements. The secure communications module 28 may thus facilitate communications between the server entity 20' and the client computers, including scanners, readers, printers and/or integrated devices, at, for example, passport scanning facilities. The secure communications module 28 may be operable to communicate with client computers within each country via a country-specific VPN (Virtual Private Network). In some embodiments, a separate VPN for each (passport) scanning facility can be employed. Country-specific communications facilitate the transfer of information between countries (within the limits of both countries' laws) via the server entity, despite incompatibility between respective passport-related electronic systems of different countries.

More generally, the secure communications module 28 may be adapted to facilitate the transfer of information between subscribing customers despite incompatibilities between their respective systems by receiving data from a first subscribing customer in accordance with a first communication protocol and then transmitting data from the server entity to a second subscribing customer in accordance with a second communication protocol wherein the first and second communication protocols are not necessarily compatible with each other. Any number of modules of the server entity 20' may be integrated into a customized "black-box unit", and any given module may be commercialized as a stand-alone unit suitable for integrating with existing third-party electronic systems.

Figure 4:
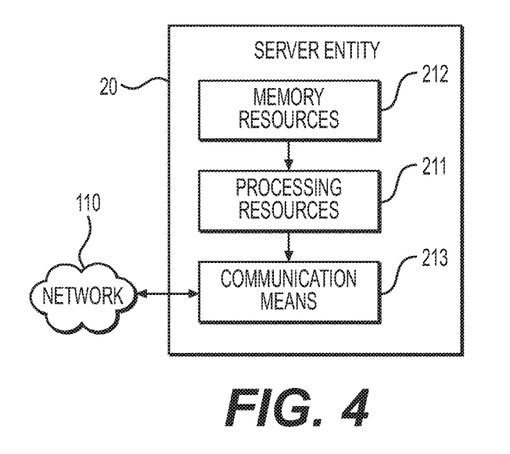
FIG. 4 shows a schematic view of a general apparatus embodiment of a server entity for remote mark printing on a security document.

FIG. 4 shows a schematic view of a general apparatus embodiment of a server entity for security document analysis. In general, the server entity 20 can be any entity that provides processing resources 211 (e.g. processing unit, processing unit collection, CPU, share of a data/processing center, etc.), memory resources 212 (memory device, database, share of a data center), and communication means 213. By means of the latter, the entity 20 can communicate with the communication network 110. The memory resources 212 may store code that instructs the processing resources 211 during operation to implement any embodiment of the present invention.

Specifically, the memory resources 212 may store code that instruct the processing resources 211 during operation to implement an interface adapted to receive, from field equipment and via a network, request information relating to mark to be printed onto a security document. According to the present embodiment, the memory resources 212 store code that instruct the processing resources 211 during operation to implement further a mark generation module adapted to generate data defining a mark to be printed on the security document and a remote printer control module adapted to control printing equipment remote from the system to print the mark on the security document.

Figure 5:
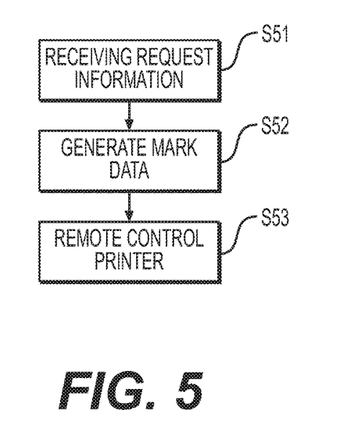
FIG. 5 shows a flowchart of a general method of operation embodiment of the present invention.

FIG. 5 shows a flowchart of a general method of operation embodiment of the present invention. This method embodiment is described in the context of an exemplary scenario relating to passport control and authentication. This scenario considers a first step S51 (RECEIVING REQUEST INFORMATION) of receiving, from field equipment and via a network, request information relating to mark to be printed onto a security document. In a step S52 (GENERATE MARK DATA) data defining a mark to be printed on the security document is generated. Further, in a step S53 (REMOTE CONTROL PRINTER) printing equipment remote from the system is controlled to print the mark on the security document.

For the corresponding implementations available reader, scanners, and printers and/or integrated devices can be employed to effect printing and/or scanning a passport. The system may initially perform analytics in real-time whenever a passport is being scanned at a passport scanning facility to determine whether the number and chronology of entries and exits match, to check whether a passport holder is a person of interest to officials in the country where the holder's passport is being scanned, and/or to determine whether the behavior of the passport holder is officially noteworthy (e.g. suspicious). If a passport use is flagged as problematic, the system is able to launch an alert to the responsible officer or other officials in accordance with national laws and protocols.

On the basis of the data collected and transferred to the system, the official stamp type (e.g. work visa, student visa, etc.) that is being sought can be determined in a reliable and centrally controlled fashion. The system can then communicate to the responsible officer operating the field equipment (reader/printer) pre-determined information for guiding the officer through the procedures for interrogating the passport holder. The communicated information may include suggested questions to ask, which may include randomly selected questions, a checklist of items for the Officer to consider prior to approving the stamping, other related procedural information, and any combination thereof.

If the passport is suitable for stamping, the system retrieves from the database the appropriate official stamp template (constant part) and its dynamic part and content (i.e. template field values), and centrally (i.e. remotely) controls the printer to print the official stamp on the passport (or other security or official document) in accordance with country-specific rules regarding official stamp placement. In variations, the official stamp may be printed at a random location, at a random location within specifiable boundaries, or a location selected by the officer involved (provided the system determines that such location complies with the country-specific rules regarding placement). The official stamp (mark) may include encrypted data, including dynamically encrypted data, for a level of security unattainable by physical rubber stamps. Further, the system may control the field equipment to print any number of official stamps involving any number of official stamp templates, although one template (and sometimes two templates) is most common.

Thus, a method of operation may further include a step of analyzing any received image data so as to make a determination whether or not, and possibly where, a mark is to be printed on the security document. Specifically, the already mentioned mechanisms (plausibility, rule conformity, and the like) may be employed to find any possible irregularities. If no irregularities are found or the presented security document (e.g. passport) use is otherwise not objectionable, a mark as "virtual" (i.e. digitally stored) official stamp can be generated, which may be an entry and/or exit stamp for example, that is stored in the database module such that it is accessible to the responsible officer and subsequently to officials at other passport scanning facilities within the limits permitted by the laws of each pair of countries (i.e. the country where the data was collected and the country where it is being accessed). In some embodiments, the system may inform in real-time the responsible officer or other official who has scanned a passport where prior official (e.g. visa) stamps are located in the passport. For example, when a passport holder is exiting a country, embodiments of the present invention can inform the responsible officer the page number upon which the corresponding preceding entry stamp is located.

Generally, each mark (official stamp) template can have any suitable artistic design and layout, including specifying a color, shade and type of ink (e.g. selection of cartridge set or ink tank set) to be employed when printing the official stamp. Further, there can be any number of template fields, including template fields associated with the position (e.g. portrait, landscape, custom angled) of the official stamp on the passport; additional text (e.g. location name, travel restrictions, other messages, etc.) to be dynamically applied; human-readable and/or machine-readable (e.g. bar) codes to include encrypted data (e.g. stamp identification, Officer or passport holder's biometrics or other identification data, encrypted messages, encrypted forms of any other field's data, etc.); other fields; and any combination thereof.

A detailed list of possible template fields can be identified as follows, from which any number of template field(s) can be selected to find implementation in an embodiment of the present invention:
1) STAMP_DIRECTION=0;
2) STAMP_AIRPORT_NAME=1;
3) STAMP AIRPORT NUMBER=2;
4) STAMP_OFFICER_NAME=3;
5) OFFICER_NUMBER=4;
6) GATE_SECTION=5;
7) GATE_NUMBER=6;
8) ENTER_DATE=7;
9) ENTER_TIME=8;
10) EXIT_DATE=9;
11) EXIT_TIME=10;
12) DURATION=11;
13) DOCUMENT_TYPE=12;
14) DOCUMENT_SUBTYPE=13;
15) DOCUMENT_NUMBER=14;
16) DOCUMENT_ISSUE_COUNTRY=15;
17) PASSENGER_LAST_NAME=16;
18) PASSENGER_GIVEN_NAME=17;
19) PASSENGER_CITIZEN=18;
20) PASSENGER_DATE_BIRTH=19;
21) PASSENGER_GENDER=20;
22) PASSENGER_PLACE_BIRTH=21;
23) DOCUMENT_ISSUE_DATE=22;
24) DOCUMENT_ISSUE_PLACE=23;
25) DOCUMENT_EXPI RY_DATE=24;
26) PASSENGER_SOCI AL_ID=25;
27) TRAVEL_PURPOSE=26;
28) STAMP_ID=27;

In a further embodiment of the present invention, the system is configured to perform the following mode operation: The system receives user input providing altered or otherwise new template data, determines the country to which the new template data applies, transfers the new template data to each of that country's field equipment, communicates a message to officials in the field that an update is available. When any devices from the field equipment are next rebooted or otherwise updated, the new template data replaces the template data that was previously in use. Distributing the new template to each of that country's field equipment may involve distributing the new template to border facilities, embassies worldwide, police organizations or other agencies worldwide for example.

Although detailed embodiments have been described, these only serve to provide a better understanding of the invention defined by the independent claims, and are not to be seen as limiting.

The invention claimed is:

1. A system for remote mark printing onto an already existing physical security document comprising:
- an interface adapted to receive, from field equipment and via a network, request information relating to a mark to be physically printed onto the already existing physical security document;
- a mark generation module adapted to generate data defining the mark to be physically printed onto the already existing physical security document; and
- a remote printer control module adapted to control printing equipment remote from the system to physically print the mark onto the already existing physical security document.

2. The system according to claim 1, wherein the remote printer control module is adapted to transmit parts of printing command data one after another, and is adapted to wait for an acknowledgement before a next part is transmitted.

3. The system according to claim 1, wherein the mark generation module is adapted to generate the data from a template part and a dynamic part.

4. The system according to claim 3, wherein the template part is stored at a central location and the system is configured to centrally update said template part.

5. The system according to claim 1, further comprising an analytics module adapted to analyze received graphical data of an image of the already existing physical security document and to generate an analysis result.

6. The system according to claim 5, wherein the analytics module is further adapted to make a determination whether or not the mark is to be physically printed onto the already existing physical security document.

7. The system according to claim 5, wherein the analytics module is further adapted to make a determination where on the already existing physical security document the mark is to be printed.

8. The system according to claim 1, further comprising a sensor adapted to sense tampering with the system.

9. The system according to claim 8, wherein said sensor is any one of a temperature sensor, a pressure sensor, a vibration sensor, and/or a location sensor.

10. The system according to claim 1, further comprising a firewall module adapted to protect the system from network attacks and/or physical attacks to the system's hardware.

11. The system according to claim 5, further comprising a secure communication module adapted to provide secure communication of said image data and/or a notification of the analysis result.

12. The system according to claim 1, being adapted to communicate with an external database.

13. The system according to claim 1, wherein the system is remote from the equipment that performs physical printing of the mark onto the already existing physical security document.

14. A method for remote mark printing onto an already existing physical security document comprising:
- a step of receiving, from field equipment and via a network, request information relating to a mark to be physically printed onto the already existing physical security document;
- a step of generating data defining the mark to be physically printed onto the already existing security document; and
- a step of remotely controlling printing equipment remote from the system to physically print the mark onto the already existing physical security document.

* * * * *